United States Patent
Mason (10) Patent No.: US 12,203,566 B2
(45) Date of Patent: Jan. 21, 2025

(54) ISOLATION SERVICE VALVE ASSEMBLY FOR MOTORIZED ZONE VALVES

(71) Applicant: NIBCO Inc., Elkhart, IN (US)

(72) Inventor: Christopher W. Mason, Granger, IN (US)

(73) Assignee: NIBCO Inc., Elkhart, IN (US)

(*) Notice: Subject to any disclaimer, the term of this patent is extended or adjusted under 35 U.S.C. 154(b) by 254 days.

(21) Appl. No.: 17/986,161

(22) Filed: Nov. 14, 2022

(65) Prior Publication Data
US 2024/0159329 A1 May 16, 2024

(51) Int. Cl.
*F16K 43/00* (2006.01)

(52) U.S. Cl.
CPC .................. *F16K 43/003* (2013.01)

(58) Field of Classification Search
CPC ...................................... F16K 43/003
See application file for complete search history.

(56) References Cited

U.S. PATENT DOCUMENTS

| | | | |
|---|---|---|---|
| 5,131,623 A * | 7/1992 | Giordani | F16K 31/045 251/129.11 |
| 5,174,546 A * | 12/1992 | Giordani | F16K 31/045 251/129.11 |
| 5,205,534 A * | 4/1993 | Giordani | F16K 31/045 310/75 A |
| 6,053,416 A | 4/2000 | Specht et al. | |
| 6,186,471 B1 * | 2/2001 | Genga | F16K 31/046 251/71 |
| 6,460,563 B2 | 10/2002 | Olson et al. | |
| 6,712,027 B2 | 3/2004 | Rocheleau | |
| 7,363,935 B2 | 4/2008 | Anderson et al. | |
| 7,631,662 B2 | 12/2009 | Reck | |
| 7,681,596 B2 | 3/2010 | Reck | |
| 8,375,991 B2 | 2/2013 | Erhardt | |
| 9,546,475 B2 | 1/2017 | Lu | |
| 10,208,875 B1 | 2/2019 | Zitting | |

(Continued)

FOREIGN PATENT DOCUMENTS

| | | |
|---|---|---|
| CN | 203395270 | 1/2014 |
| CN | 106958670 | 7/2017 |

(Continued)

OTHER PUBLICATIONS

The Plumber's Choice, "1-1/4 in×2 in SWT high flow drain ball valve, purge for pipe cleanout, 3-way adjustable flow path, brass," https://www.homedepot.com/p/The-Plumber-s-Choice . . . (Oct. 9, 2020).

(Continued)

*Primary Examiner* — Kevin R Barss
(74) *Attorney, Agent, or Firm* — PRICE HENEVELD LLP (57) ABSTRACT

A motorized zone valve assembly permits the servicing and/or replacement of a motorized zone valve in a hydronic heating and/or cooling system. The motorized zone valve assembly includes isolation valves coupled to the incoming and outgoing ports of the motorized zone valve via union nuts. The isolation valve members can be closed to permit the removal of the motorized zone valve by the loosening of the two union nuts. In addition, the isolation valve coupled to the outgoing port can include a drain valve and drain port to permit the isolation and draining of individual zones of the hydronic system.

20 Claims, 10 Drawing Sheets

(56) References Cited

U.S. PATENT DOCUMENTS

| | | |
|---|---|---|
| 10,247,327 B2 | 4/2019 | Doughty et al. |
| 11,022,985 B2 | 6/2021 | Cheng et al. |
| 11,359,729 B1 | 6/2022 | Mason et al. |
| 11,421,791 B2 | 8/2022 | Mason |
| 2004/0124386 A1 | 7/2004 | Carey |
| 2005/0205819 A1 | 9/2005 | Morrison |
| 2008/0073442 A1 | 3/2008 | Wieder |
| 2010/0252129 A1 | 10/2010 | Olsen et al. |
| 2011/0073201 A1 | 3/2011 | Matsui et al. |
| 2018/0259076 A1 | 9/2018 | Feng et al. |
| 2022/0042688 A1 | 2/2022 | Terry et al. |

FOREIGN PATENT DOCUMENTS

| | | |
|---|---|---|
| DE | 202014000877 | 2/2014 |
| JP | 2020097902 | 6/2020 |
| RU | 2531717 | 10/2014 |

OTHER PUBLICATIONS

Watts, "Series RPVM1-Press residential purge" flier, Watts.com (© 2020 Watts).
Watts, Thermal Expansion Products, http://media.wattswater.com/PG-ThermExpansion.pdf (2013).
Webstone, "PROPAL Series" Ball Drain Valve brochure, Webstone Company, Inc. (© 2016 Webstone).

\* cited by examiner

ISOLATION SERVICE VALVE ASSEMBLY FOR MOTORIZED ZONE VALVES

BACKGROUND OF THE INVENTION

The present invention relates generally to an isolation valve assembly for a motorized zone valve. Motorized zone valves are used in hydronic heating and cooling systems to control the flow of water to individual heating/cooling zones. These valves are operated by an electric motor, usually actuated by a thermostat, which opens or closes a ball that is inside the motorized zone body thereby controlling the flow of heated/cooled water in the system.

Motorized zone valves are typically connected to the incoming water supply pipe and outgoing water supply pipe by a sweat or female pipe thread (FIP) connection and are, therefore, not easy to remove from the plumbing system. If the motorized zone valve should need to be replaced and/or internal components serviced, the motorized zone valve and surrounding pipes typically need to be cut out of the plumbing system. This can require the shutting down of the plumbing system. Thus, when the portions of the valve become damaged, such as a worn ball, debris obstruction, and/or inoperable drive mechanism, the replacement of the motorized zone valve can require extensive plumbing work to remove and recouple the motorized zone valve with new fittings to the plumbing system.

Thus, an isolation service valve assembly that permits the removal of a motorized zone valve without shutting off the incoming water supply and/or removal/installation of any plumbing fittings would be advantageous.

SUMMARY OF THE INVENTION

One aspect of the present invention is a motorized zone valve assembly. The motorized zone valve assembly has a housing, an incoming port with a union nut, and an outgoing port with a union nut. A first valve assembly has a tee-shaped valve body with an inlet, an oppositely disposed outlet, a first fluid passageway extending between said inlet and outlet, a drain port, and a second fluid passageway extending from the drain port to the first fluid passageway. A first valve member with a ball is positioned in between the inlet and the outlet, at the intersection of the first fluid passageway and the second fluid passageway. A second valve member with a ball is positioned in said second fluid passageway. A second valve assembly having an inlet and an oppositely disposed outlet, a fluid passageway extending between the inlet and the outlet, with a third valve member positioned in the fluid passageway. The first valve assembly is coupled to the outgoing port and the second valve assembly is coupled to the incoming port.

Yet another aspect is a plumbing assembly for coupling to a motorized zone valve. The plumbing assembly has a motorized zone valve with a housing, an incoming port with a union nut, and an outgoing port with a union nut. A first valve assembly has a valve body with an inlet, an oppositely disposed outlet, a first fluid passageway extending between the inlet and outlet, a drain port, and a second fluid passageway extending from the drain port to the first fluid passageway. A first valve member with a ball is positioned in between the inlet and the outlet, at the intersection of the first fluid passageway and the second fluid passageway. A second valve member with a ball positioned in the second fluid passageway. A second valve assembly with an inlet and an oppositely disposed outlet, a fluid passageway extending between the inlet and the outlet, with a third valve member positioned in the fluid passageway. The first valve assembly is coupled to the outgoing port of the motorized zone valve and the second valve assembly is coupled to the incoming port of the motorized zone valve.

Yet another aspect are isolation valve assemblies for a motorized zone valve. The isolation valve assemblies have a first isolation valve assembly with a valve body with an inlet, an oppositely disposed outlet, a first fluid passageway extending between the inlet and outlet, a drain port, and a second fluid passageway extending from the drain port to the first fluid passageway. A first valve member with a ball is positioned in between the inlet and the outlet, at the intersection of the first fluid passageway and the second fluid passageway. A second valve member with a ball is positioned in the second fluid passageway. A second isolation valve assembly with an inlet and an oppositely disposed outlet, a fluid passageway extending between the inlet and the outlet, with a third valve member positioned in the fluid passageway. The first valve assembly is coupled to an outgoing port on a motorized zone valve, and the second valve assembly is coupled to an incoming port on the motorized zone valve.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
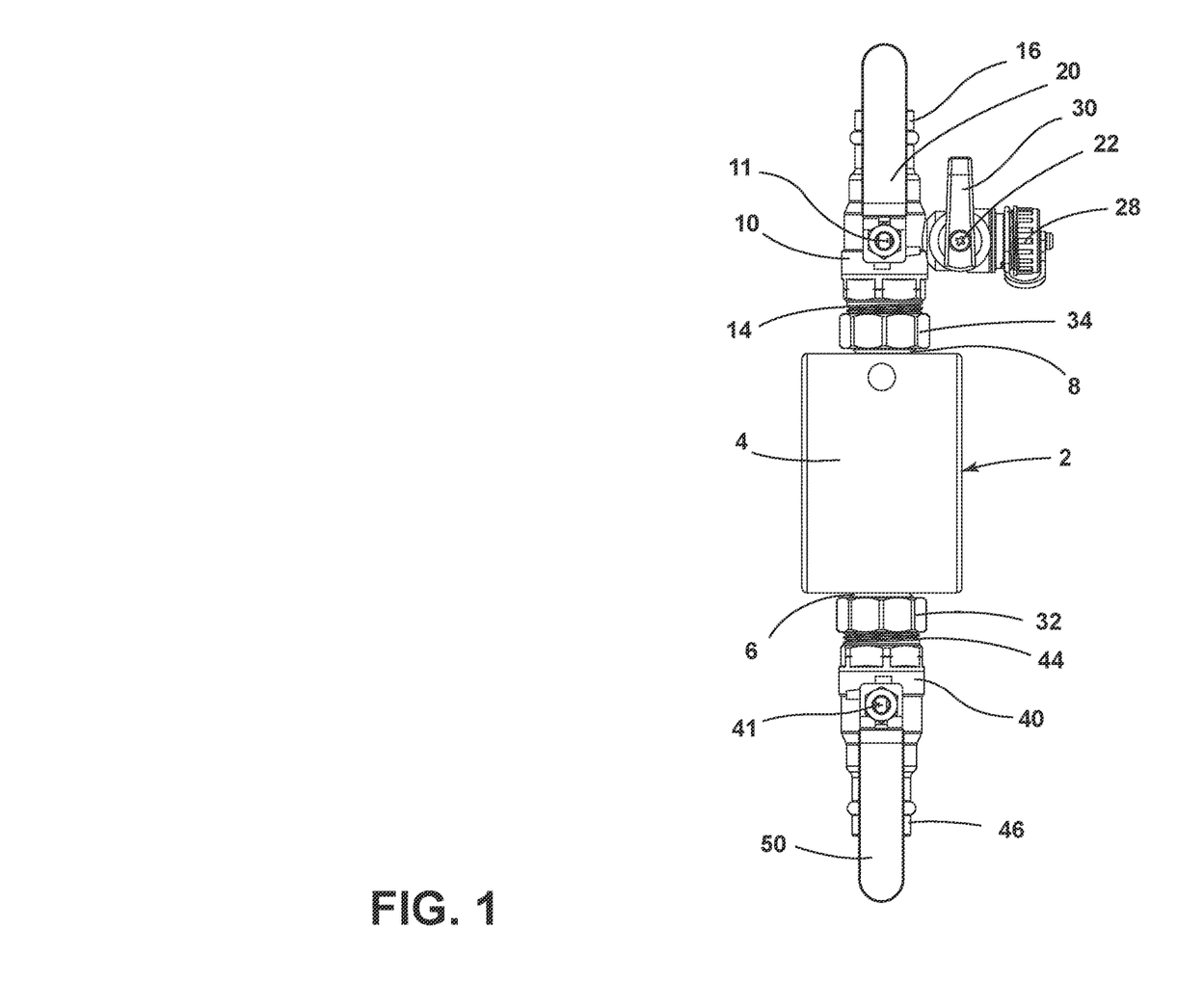
FIG. 1 is a top view of a motorized zone valve assembly.
Figure 2:
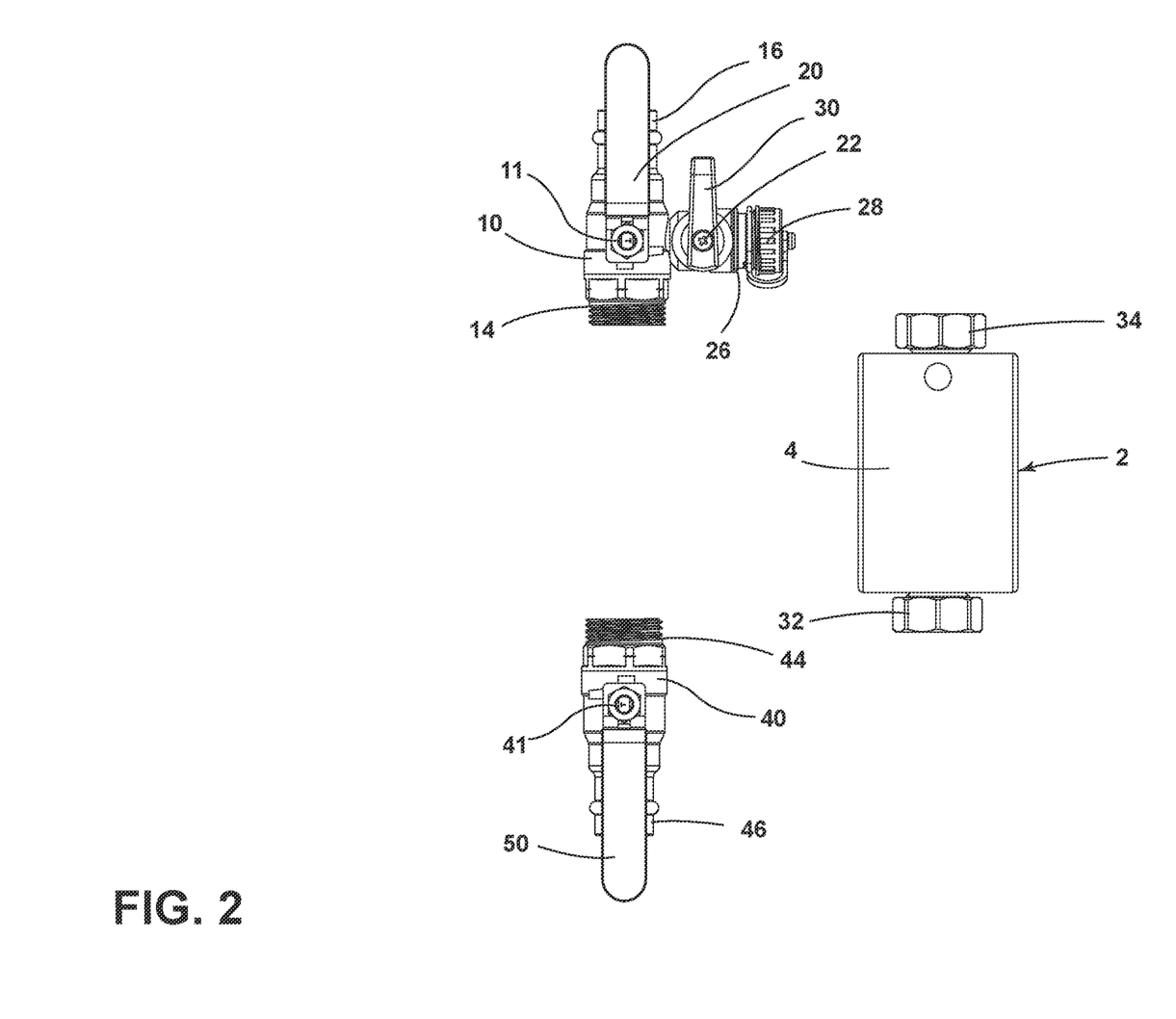
FIG. 2 is a top view of the motorized zone valve assembly shown in FIG. 1 with the motorized zone valve decoupled from the valve assembly.
Figure 8:
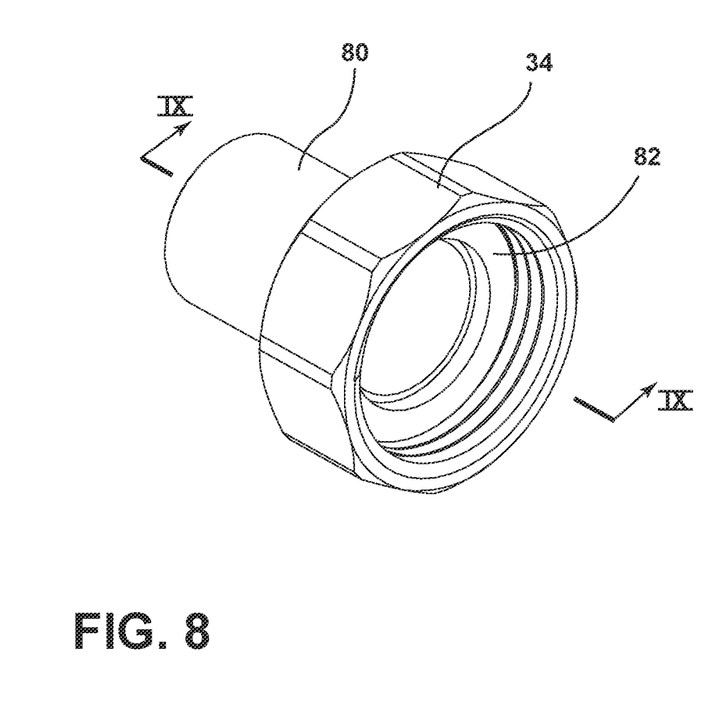
FIG. 8 is a side perspective view of a union nut coupling.
Figure 9:
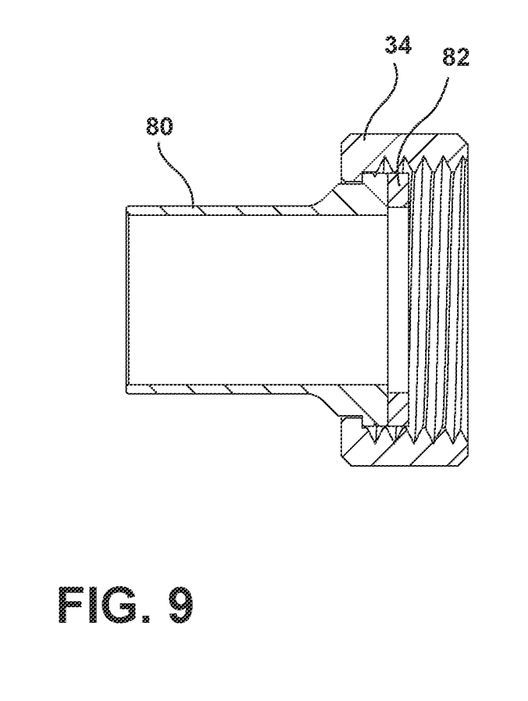
FIG. 9 is a side cross-sectional view of the union nut coupling shown in FIG. 8, taken along line IX-IX.
Figure 10:
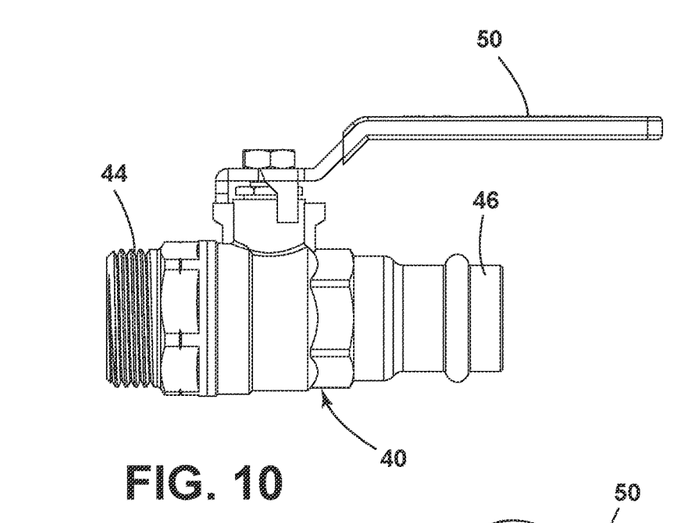
FIG. 10 is a side view of the valve assembly that is coupled to the incoming end of the motorized zone valve.
Figure 11:
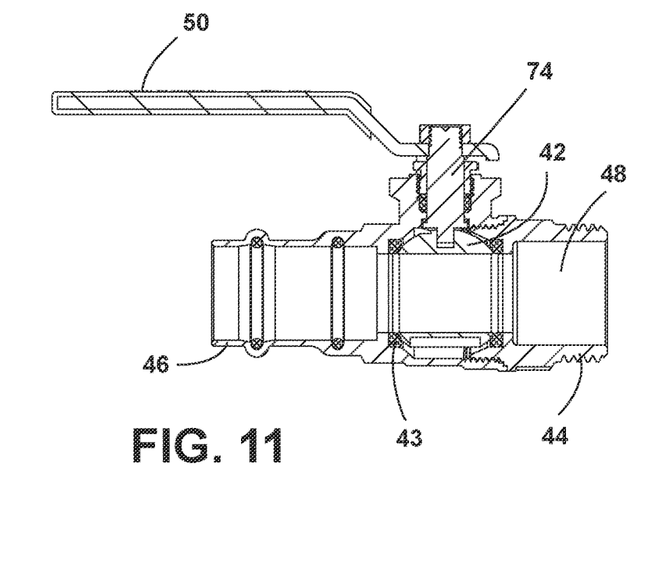
FIG. 11 is a side cross-sectional view of the valve assembly shown in FIG. 10.
Figure 12:
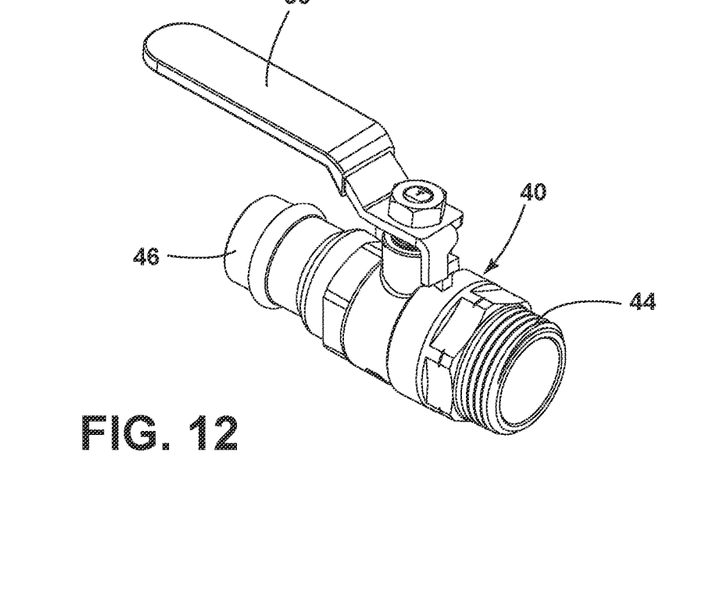
FIG. 12 is a side perspective view of the valve assembly shown in FIG. 10.

A motorized zone valve assembly 2 is illustrated in FIG. 1. The motorized zone valve assembly 2 includes a motorized zone valve housing 4. The motorized zone valve housing 4 includes an inlet 6 and an outlet 8. A union member 32 is coupled to the inlet 6, and a union member 34 is coupled to the outlet 8. The union member 34 can be coupled to a fitting 80, as shown in FIGS. 8 and 9. A gasket 82 can be inserted into the union member 34. The gasket 82 can be made of compressible material, such as EPDM. The fitting 80 is illustrated as being an FTG fitting, which can be inserted into the outlet 8 of the motorized zone valve housing 4. Similarly, the union member 32 can be coupled to a fitting 90 and coupled to the inlet 6 of the motorized zone valve housing 4. The fittings 80, 90 are illustrated as separate pieces from the motorized zone valve housing 4. While the illustrated embodiments show FTG fittings, different types of couplings can be arranged between the fittings 80, 90 and the inlet/outlet (6/8). Alternatively, the fittings 80, 90 can be integrally formed with the inlet 6 and outlet 8 of the motorized zone valve housing 4.

Figure 3:
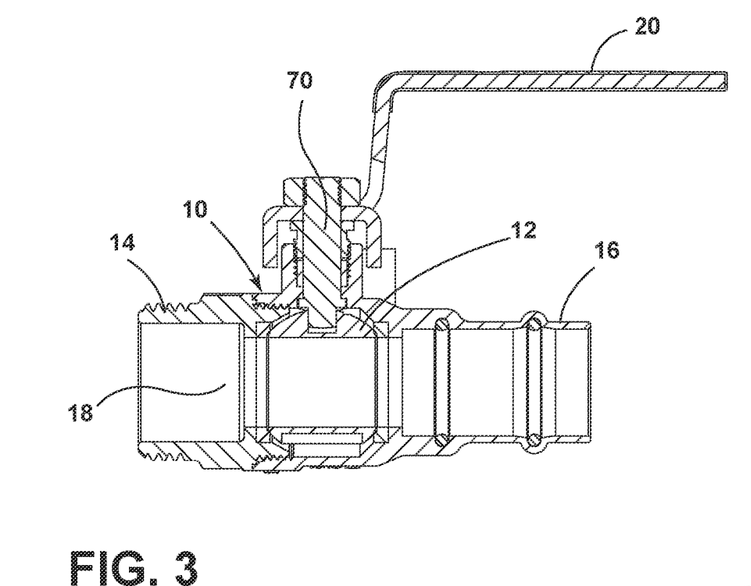
FIG. 3 is a side cross-sectional view of the valve assembly that is coupled to the outgoing end of the motorized zone valve.
Figure 4:
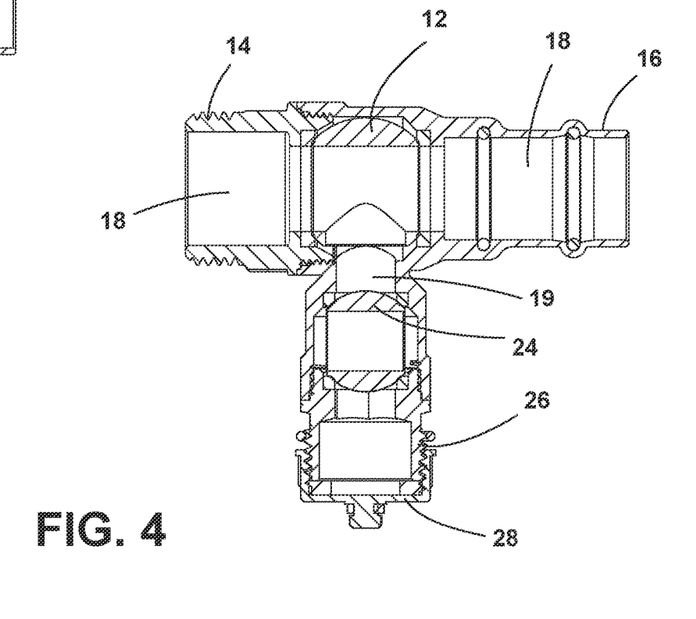
FIG. 4 is a top cross-sectional view of the valve assembly shown in FIG. 3.
Figure 5:
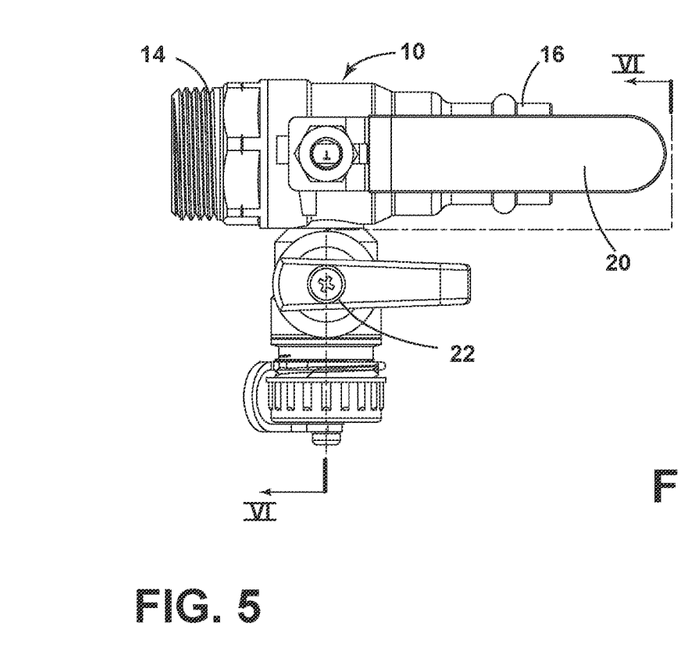
FIG. 5 is a top perspective view of the valve assembly shown in FIG. 3.
Figure 6:
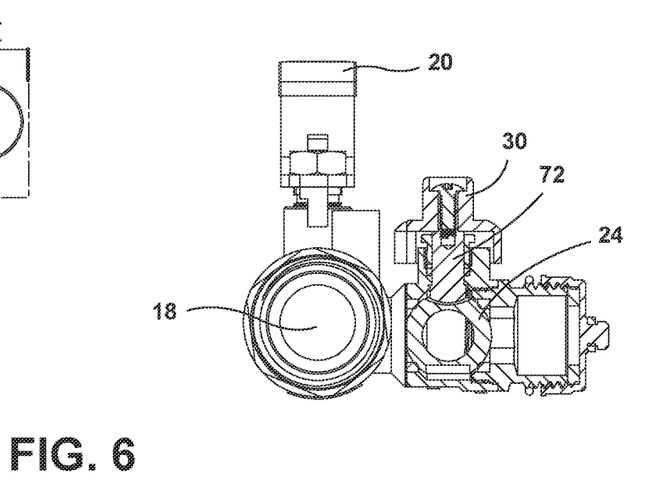
FIG. 6 is a partial front perspective, cross-sectional view of the valve assembly taken along lines VI-VI of FIG. 5.
Figure 7:
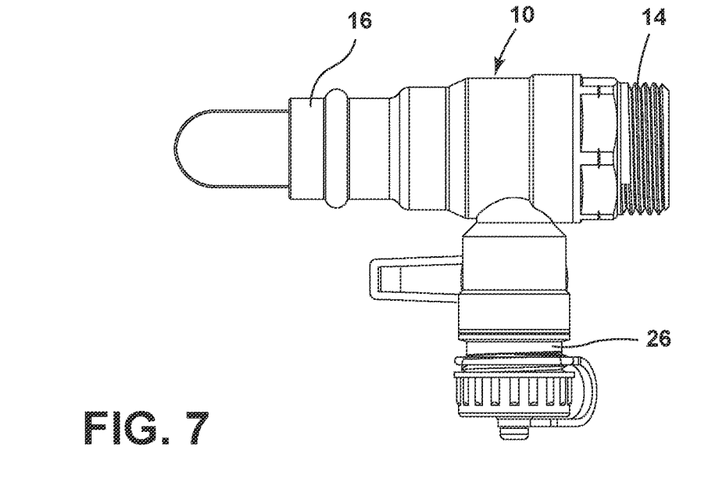
FIG. 7 is a bottom view of the valve assembly shown in FIG. 3.

The motorized zone valve assembly 2 includes a first valve assembly 10. The first valve assembly 10 includes a tee-shaped body, as shown in FIG. 4. The tee-shaped body can be integrally formed or can include one or more sections that threadedly engage each other, as shown in FIGS. 3 and 4. The first valve assembly 10 includes a first valve member 11 with a ball 12 that is positioned in the first fluid passageway 18 between the inlet 14 and the oppositely disposed outlet 16 of the first valve assembly 10. A handle 20 can be coupled to a stem 70 to move the ball 12 within the first fluid passageway 18 of the first valve assembly 10. The first valve assembly 10 also includes a drain port 26 that can include a cap member 28. A drain valve 22 has a second ball 24 that is positioned within the second fluid passageway 19 that heads to the drain port 26. As illustrated in FIG. 4, the first ball 12 is positioned at the intersection of the first fluid passageway 18 and the second fluid passageway 19. The second ball 24 is positioned between the first ball 12 and the drain port 26. A handle 30 can actuate the stem 72 that is connected to the second ball 24 to open and close the second fluid passageway 19.

Figure 13:
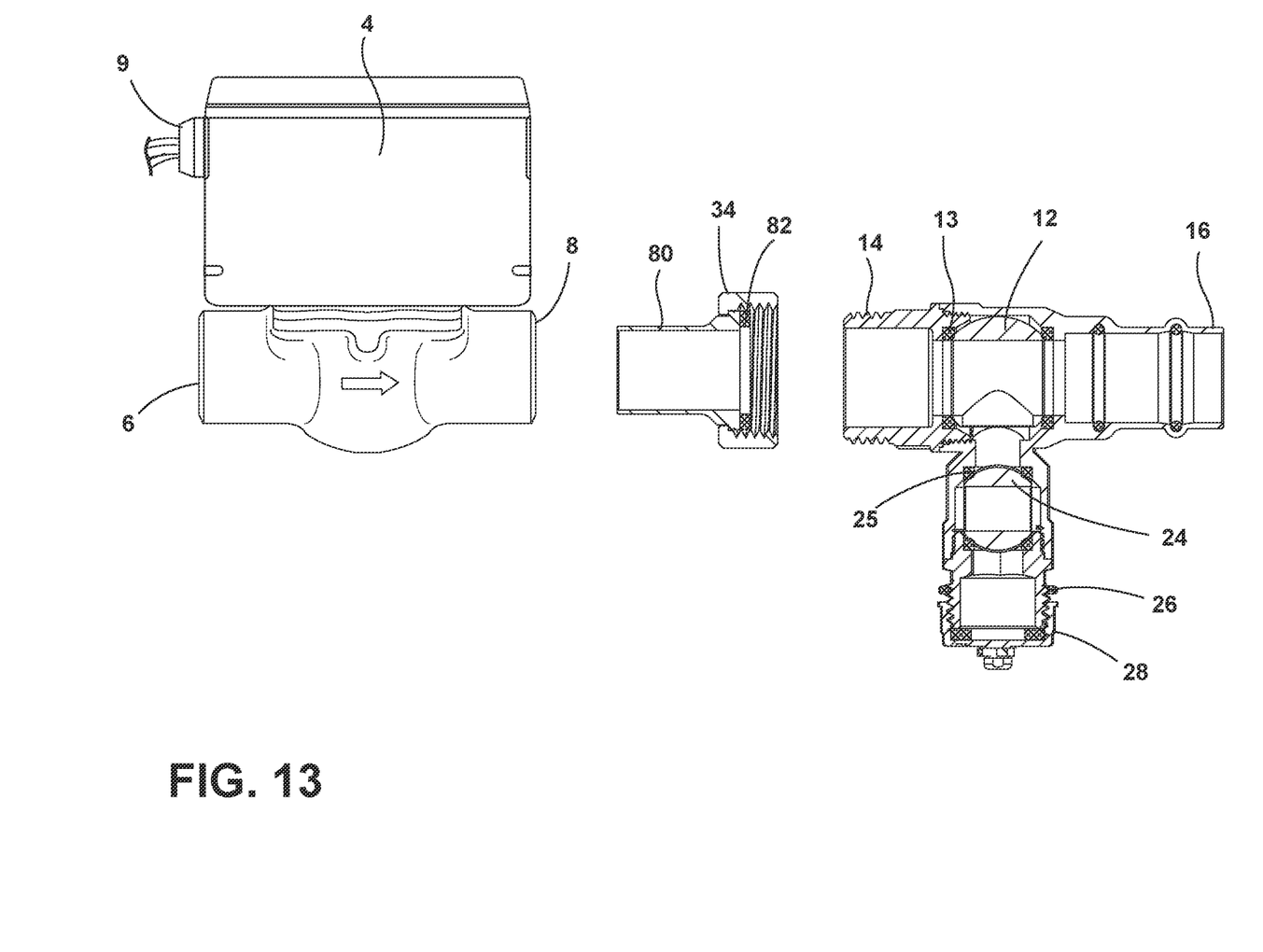
FIG. 13 is a partial side cross-sectional view of the motorized zone valve and the valve assembly of FIG. 3.
Figure 14:
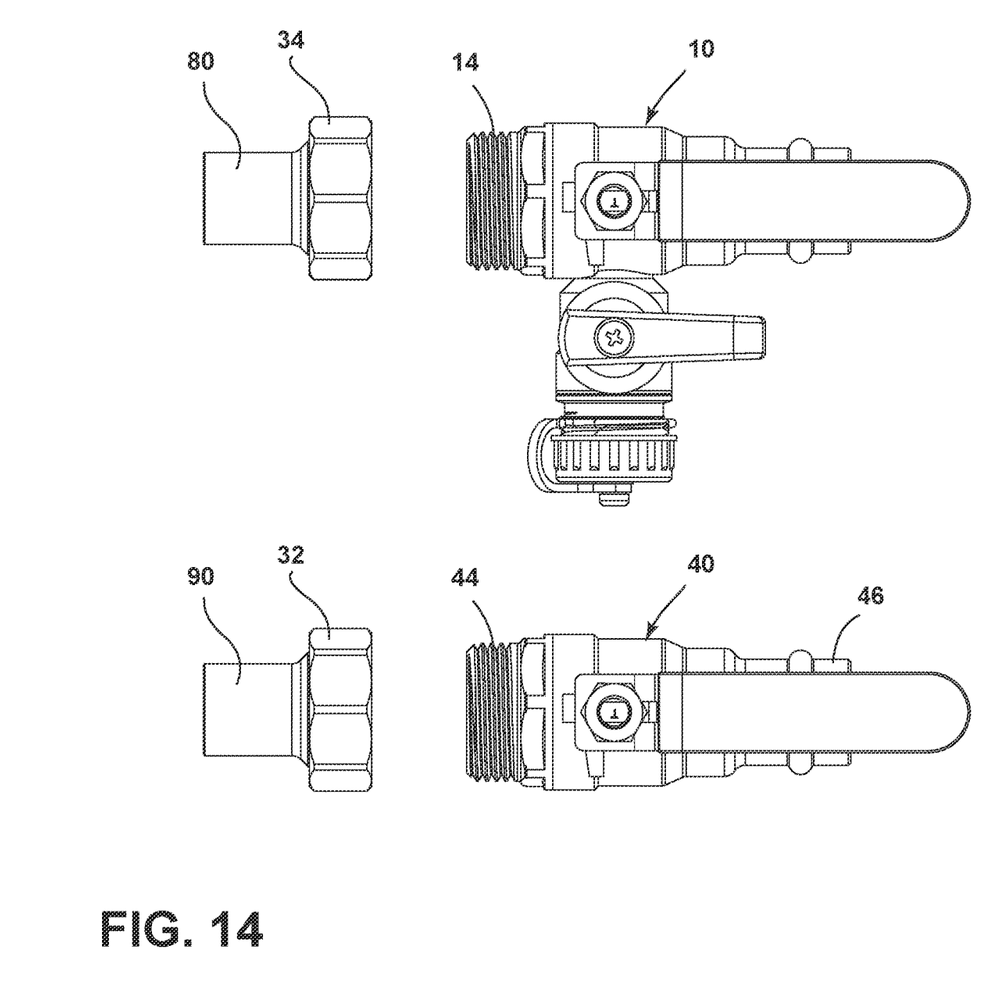
FIG. 14 is a top view of the valve assemblies shown in FIGS. 3 and 10 with the union nut couplings of FIG. 8.

The inlet 14 of the first valve assembly 10 includes an external threaded section. The outlet 16 can be any type of plumbing fitting including a PEX fitting, push-to-connect fitting, press fitting, sweat, female pipe thread, male pipe thread, or other type of fitting. In the illustrated embodiment, the outlet 16 is a press fitting that can be coupled by threaded engagement to the outgoing water supply. The inlet 14 of the first valve assembly 10 is coupled by threaded engagement to the union 34, as shown in FIGS. 1, 13, and 14.

A second valve assembly 40 includes a third valve member 41 with a ball 42 that is positioned within the fluid passageway 48 between the inlet 46 and the outlet 44 of the second valve assembly 40. The third valve member 41 can be actuated by movement of the handle 50 that is connected to a stem 74 that is connected to the ball 42. The outlet end 44 of the second valve assembly 40 includes a threaded exterior surface that couples to the threaded internal surface of the union member 32 on the inlet 6 of the motorized zone valve housing 4, as illustrated in FIGS. 1 and 14. The inlet 46 of the second valve assembly 40 can be any type of plumbing fitting. In the illustrated embodiment, the inlet end 46 is a press fitting. The outlet 16 of the first valve assembly 10 and the inlet 46 of the second valve assembly 40 can be the same or different types of fittings and sizes of fittings, thereby potentially coupling to different sizes and/or types of piping or other plumbing components.

Figure 15:
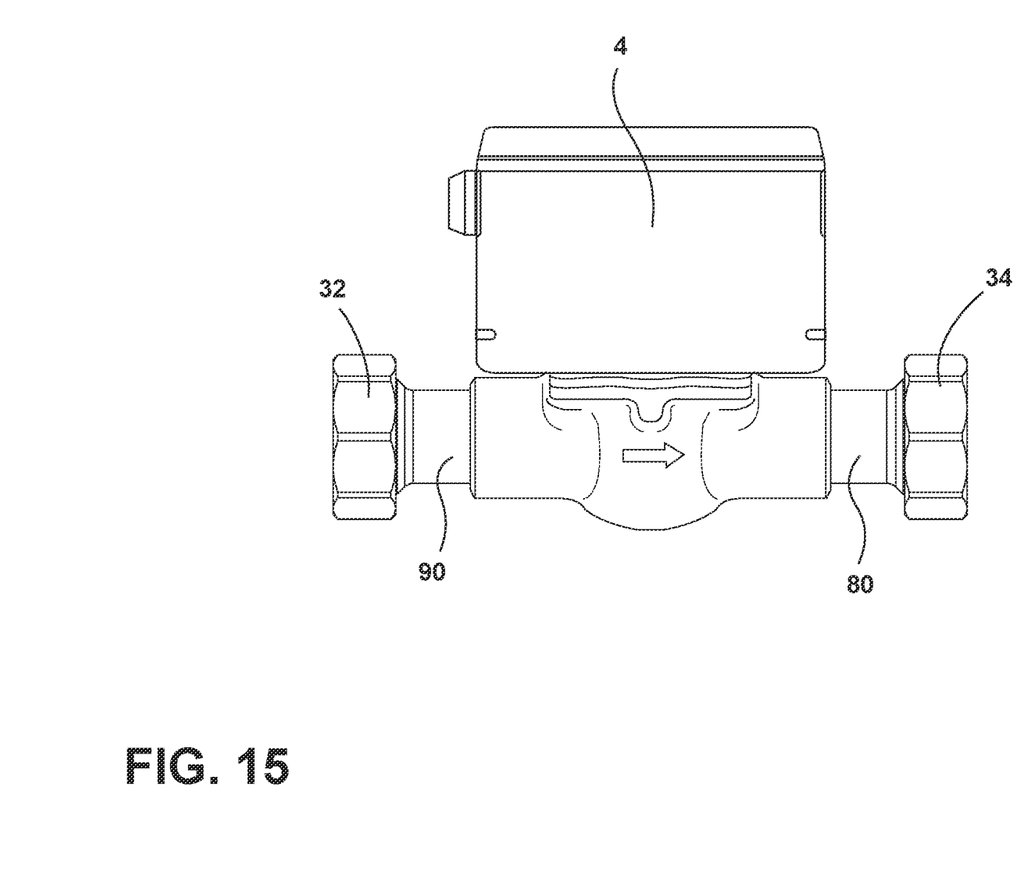
FIG. 15 is a side view of the motorized zone valve with the union nut couplings in a horizontal orientation.
Figure 16:
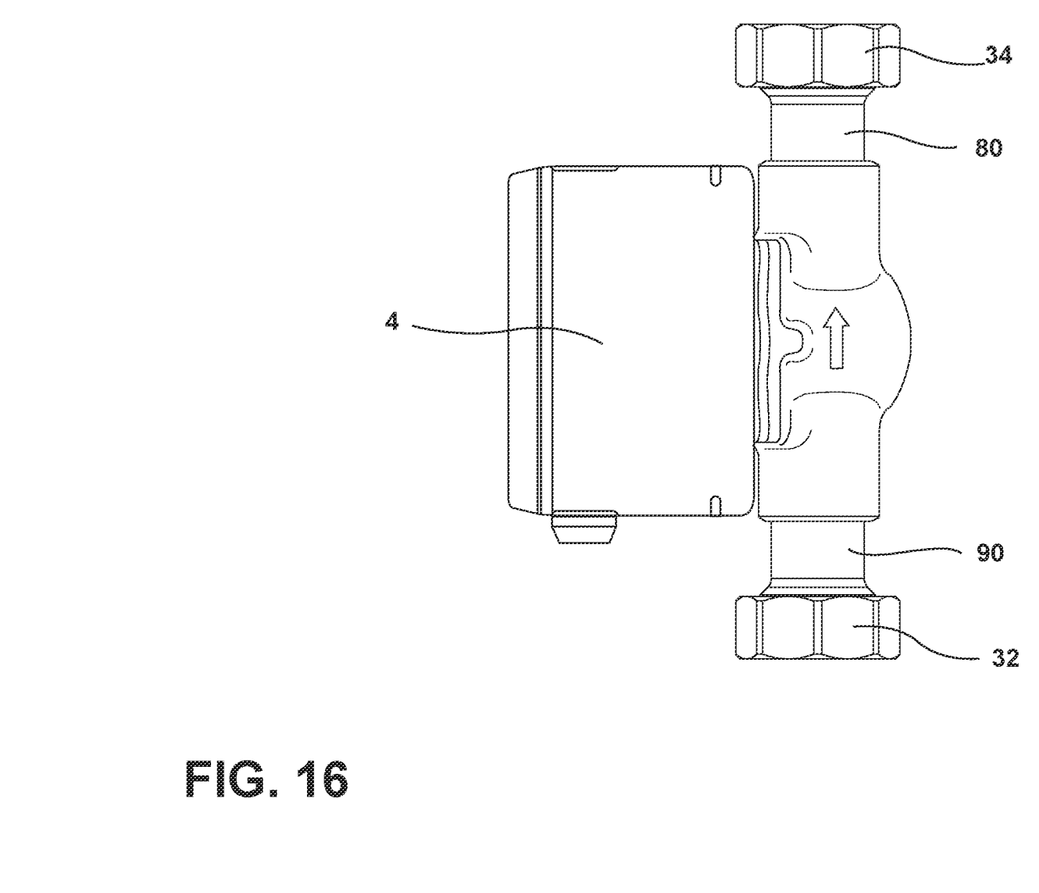
FIG. 16 is a side view of the motorized zone valve with the union nut couplings in a vertical orientation.

The use of the union members 32 and 34 in threaded engagement with the first valve assembly 10 and second valve assembly 40 permits the removal of the motorized zone valve housing 4 by the decoupling of the threaded engagement of the unions 32, 34 with the exterior threaded surfaces on the inlet 14 of the first valve assembly 10 and the outlet 44 of the second valve assembly 40. In the illustrated embodiment, the inlet 46 of the second valve assembly 40 is coupled to the incoming water supply. The outlet 16 of the first valve assembly 10 is coupled to the outgoing water supply. As illustrated in FIGS. 15 and 16, the motorized zone valve housing 4 can be installed in a variety of manners, including, but not limited to, a generally horizontal manner (FIG. 15) or a generally vertical manner (FIG. 16), depending upon the space for and requirements of the plumbing system.

The motorized zone valve housing 4 includes an electrically powered motor (not shown) that opens or closes the flow of water from the motorized zone valve assembly 2. The arrangement shown in FIG. 1 permits the closing of the first fluid passageway 18 by movement of handle 20 and the closing of the fluid passageway 48 in the second valve assembly 40 by movement of the ball 42 by handle 50 to close off the water supply to and from the motorized zone valve housing 4. This permits the removal of the motorized zone valve housing 4 from the first valve assembly 10 and the second valve assembly 40 thereby permitting the motorized zone valve housing 4 and/or its internal components to be replaced and/or serviced. In addition, the use of the drain valve 22 permits the plumbing system and the associated heating and cooling zones to be drained and/or flushed by positioning the ball 24 to open the fluid passageway 19 headed to the drain port 26. Also, depending upon the orientation of the installation, the motorized zone valve housing 4 can also be purged and/or drained by the opening of the fluid passageway 19.

The first valve assembly 10 and second valve assembly 40 can be made from a metal material, such as a lead-free DZR brass alloy. The use of EPDM gaskets 82 in the unions 32, 34 permit the water tight sealing of the first valve assembly 10 and the second valve assembly 40 by the compression of the gasket when the threaded surfaces of those valve assemblies 10, 40 are coupled to the threaded surfaces of the unions 32, 34. Other types of sealable gaskets 82 can be used.

In the illustrated embodiments, the handles 20, 30, and 50 are all positioned on the same side of the motorized zone valve housing 4. However, the use of the unions 32, 34 permit the rotation of the first valve assembly 10 and second valve assembly 40 with respect to the motorized zone valve housing 4 and can permit the handles to be opened in different orientations depending upon spatial constraints.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A motorized zone valve assembly, comprising:
    a motorized zone valve having a housing, an incoming port with a union nut, and an outgoing port with a union nut;
    a first valve assembly having a tee-shaped valve body with an inlet, an oppositely disposed outlet, a first fluid passageway extending between said inlet and outlet, a drain port, and a second fluid passageway extending from the drain port to the first fluid passageway;
        a first valve member with a ball positioned in between said inlet and said outlet, at the intersection of the first fluid passageway and the second fluid passageway;
        a second valve member with a ball positioned in said second fluid passageway;
    a second valve assembly having an inlet and an oppositely disposed outlet, a fluid passageway extending between said inlet and said outlet, with a third valve member positioned in the fluid passageway;
    wherein said first valve assembly is coupled to said outgoing port; and
    wherein said second valve assembly is coupled to said incoming port.

2. The motorized zone valve assembly of claim 1, wherein said second valve assembly is coupled to an incoming water supply pipe.

3. The motorized zone valve assembly of claim 1, wherein the outlet of said second valve assembly and the inlet of said first valve assembly include a threaded surface that couples to a threaded surface on the union nuts.

4. The motorized zone valve assembly of claim 1, wherein the first valve member, second valve member, and third valve member have handles.

5. The motorized zone valve assembly of claim 4, wherein the handles are positioned on the same side of the motorized zone valve housing.

6. The motorized zone valve assembly of claim 1, wherein said tee-shaped valve body is a unitary piece.

7. The motorized zone valve assembly of claim 1, wherein said union nuts include a compressible gasket member.

8. The motorized zone valve assembly of claim 1, wherein said incoming port and said outgoing port are coupled to said housing of said motorized zone valve.

9. A plumbing assembly for coupling to a motorized zone valve, comprising:
    a motorized zone valve having a housing, an incoming port with a union nut, and an outgoing port with a union nut;
    a first valve assembly having a valve body with an inlet, an oppositely disposed outlet, a first fluid passageway extending between said inlet and outlet, a drain port, and a second fluid passageway extending from the drain port to the first fluid passageway;
        a first valve member with a ball positioned in between said inlet and said outlet, at the intersection of the first fluid passageway and the second fluid passageway;
        a second valve member with a ball positioned in said second fluid passageway;
    a second valve assembly having an inlet and an oppositely disposed outlet, a fluid passageway extending between said inlet and said outlet, with a third valve member positioned in the fluid passageway;

wherein said first valve assembly is coupled to said outgoing port of the motorized zone valve; and wherein said second valve assembly is coupled to said incoming port of the motorized zone valve.

10. The plumbing assembly of claim 9, wherein said second valve assembly is coupled to an incoming water supply pipe.

11. The plumbing assembly of claim 9, wherein the outlet of said second valve assembly and the inlet of said first valve assembly include a threaded surface that couples to a threaded surface on the union nuts.

12. The plumbing assembly of claim 9, wherein the first valve member, second valve member, and third valve member have handles.

13. The plumbing assembly of claim 12, wherein the handles are positioned on the same side of the motorized zone valve housing.

14. The plumbing assembly of claim 9, wherein said union nuts include a compressible gasket member.

15. Isolation valve assemblies for a motorized zone valve, comprising:
- a first isolation valve assembly having a valve body with an inlet, an oppositely disposed outlet, a first fluid passageway extending between said inlet and outlet, a drain port, and a second fluid passageway extending from the drain port to the first fluid passageway;
- a first valve member with a ball positioned in between said inlet and said outlet, at the intersection of the first fluid passageway and the second fluid passageway;
- a second valve member with a ball positioned in said second fluid passageway;
- a second isolation valve assembly having an inlet and an oppositely disposed outlet, a fluid passageway extending between said inlet and said outlet, with a third valve member positioned in the fluid passageway;

wherein said first valve assembly is coupled to an outgoing port on a motorized zone valve; and wherein said second valve assembly is coupled to an incoming port on the motorized zone valve.

16. The isolation valve assemblies of claim 15, wherein said second isolation valve assembly is coupled to an incoming water supply pipe.

17. The isolation valve assemblies of claim 15, wherein the outlet of said second isolation valve assembly and the inlet of said first isolation valve assembly include a threaded surface that couples to a threaded surface on the union nuts.

18. The isolation valve assemblies of claim 15, wherein the first valve member, second valve member, and third valve member have handles.

19. The isolation valve assemblies of claim 18, wherein the handles are positioned on the same side of the motorized zone valve housing.

20. The isolation valve assemblies of claim 15, wherein said union nuts include a compressible gasket member.

* * * * *